Feb. 13, 1945.  R. DE LOPEZ  2,369,286
PARACHUTE
Filed July 16, 1942  2 Sheets-Sheet 1
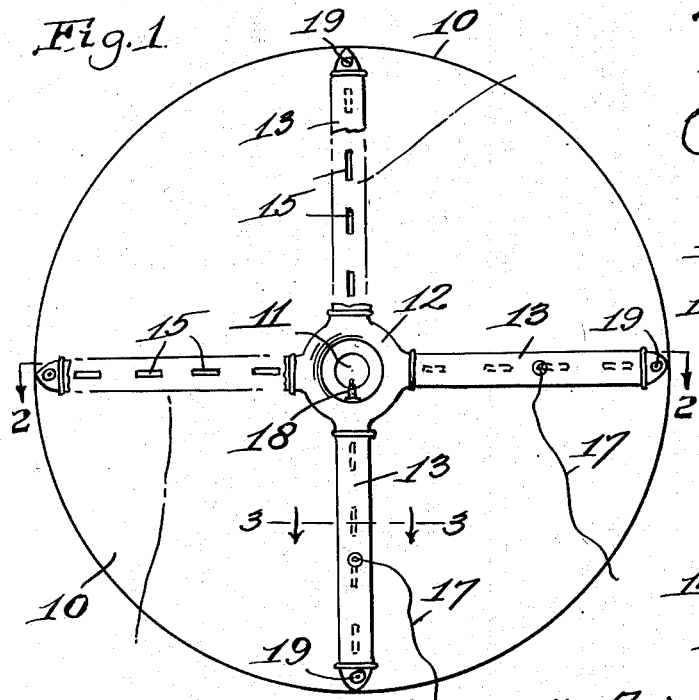
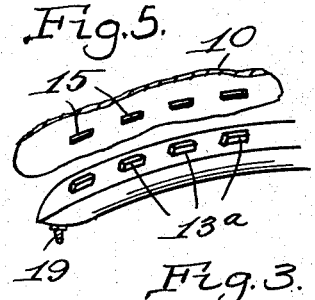
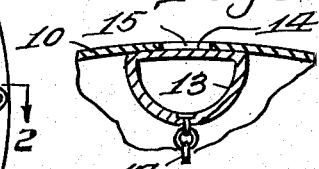
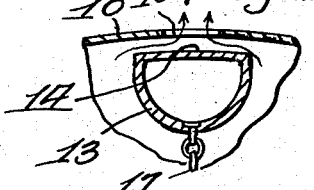
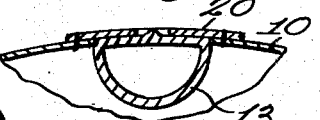
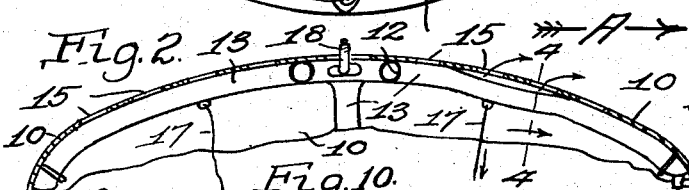
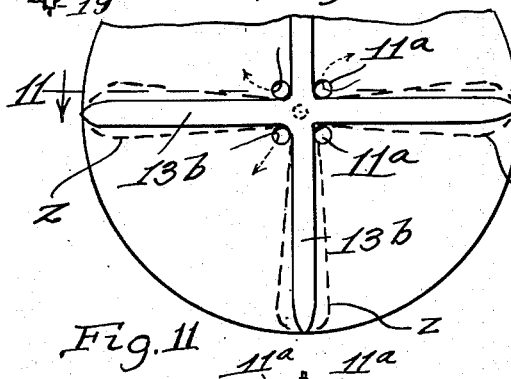
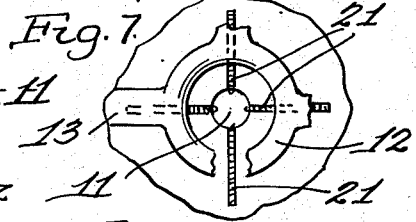
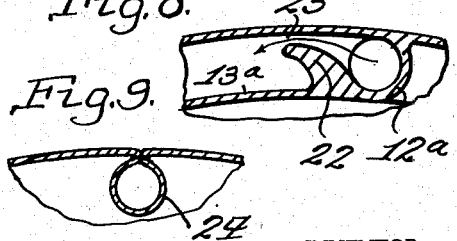
INVENTOR.
Ralph De Lopez
BY Martin P. Smith
ATTORNEY.

Feb. 13, 1945. R. DE LOPEZ 2,369,286
PARACHUTE
Filed July 16, 1942 2 Sheets-Sheet 2
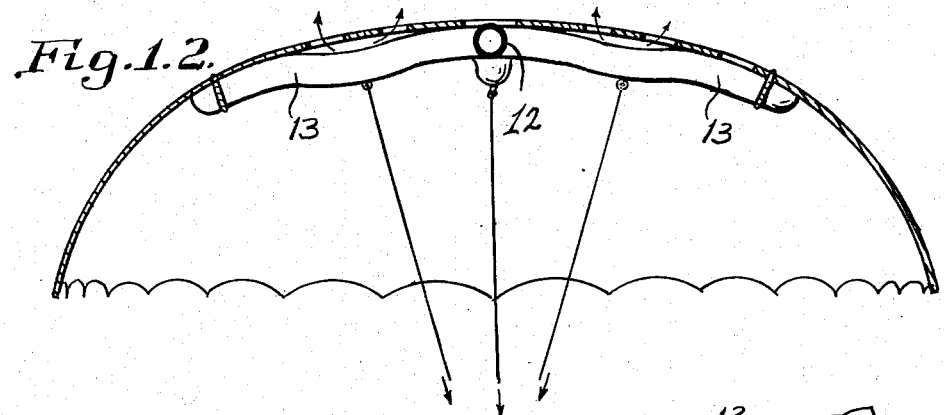
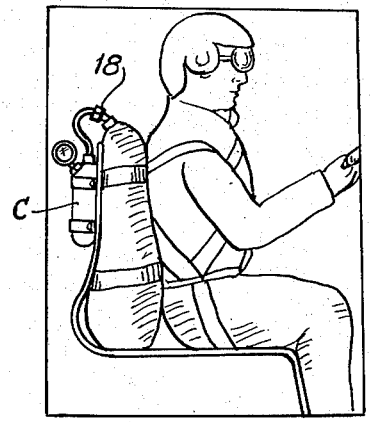
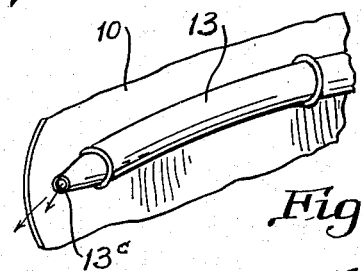
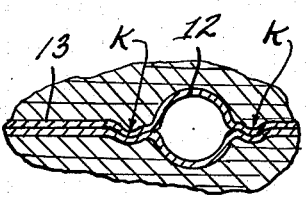
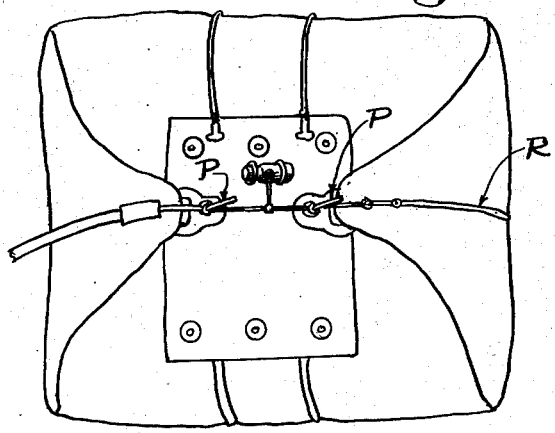
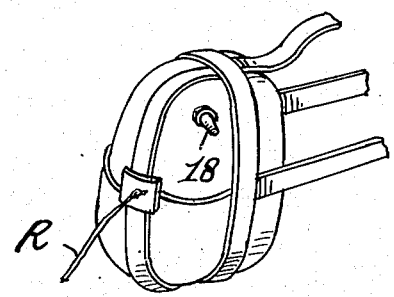
INVENTOR.
RALPH DE LOPEZ
BY
ATTORNEY.

Patented Feb. 13, 1945

2,369,286

UNITED STATES PATENT OFFICE 2,369,286

PARACHUTE

Ralph De Lopez, Los Angeles, Calif.

Application July 16, 1942, Serial No. 451,123

14 Claims. (Cl. 244—146)

My invention relates to parachutes of the general type disclosed in my co-pending application for U. S. Letters Patent filed June 26, 1941, Ser. No. 399,855, and the principal objects of my present invention are to generally improve upon and simplify the constructions disclosed in my aforesaid application, to provide simple means for controlling the escape of air from beneath the parachute so that the same may to a considerable extent be guided laterally in any direction during its descent, and further, to equip the parachute with a plurality of radially disposed hollow flexible arms adapted to receive air, gases, or other fluid under pressure so as to quickly open the parachute when it is released from its container or wrappings.

A further object of my invention is to provide a parachute with simple, effective and convenient means for enabling the jumper or user of the parachute to very accurately control the speed of descent.

A further object of my invention is to provide means for rendering the parachute buoyant, in order that it may function as a life preserver in the event that the parachute and the person carried thereby, drop into the sea or other large body of water.

With the foregoing and other objects in view, my invention consists in certain novel features of construction and arrangement of parts which will be hereinafter more fully described and claimed and illustrated in the accompanying drawings in which:

Figure 1 is a view looking against the underside of my improved parachute.

Fig. 2 is a cross section taken on the line 2—2 of Fig. 1.

Fig. 3 is an enlarged detail section taken on the line 3—3 of Fig. 1.

Fig. 4 is a sectional view similar to Fig. 3 and showing the inflated arm drawn away from the parachute body so as to uncover an air outlet therein.

Fig. 5 is a detail perspective of a portion of the parachute and a portion of one of the inflatable arms.

Fig. 6 is a detail section similar to Fig. 3 and showing a modified arrangement for mounting the inflatable arms.

Fig. 7 is a fragmentary view looking against the underside of the central portion of the parachute body and showing a modified form of the central air vent.

Fig. 8 is a detail section showing an arrangement for choking the flow of compressed air or gas into the radial arms.

Fig. 9 is a detail section of a modified form of the inflatable arms.

Fig. 10 is a view looking against the underside of a modified form of the parachute.

Fig. 11 is a cross section taken on the line 11—11 of Fig. 10.

Fig. 12 is a cross sectional view through the center of the parachute body and showing the intermediate portions of the inflatable arms drawn away from the body so as to accelerate the escape of air from beneath said body.

Fig. 13 is an elevational view of the parachute in packed condition on the wearer's back.

Fig. 14 is a detail perspective view showing a modified form of the inflatable arms.

Fig. 15 is an elevational view of the parachute folded into compact condition.

Fig. 16 is a fragmentary section showing the manifold and the arms deflated.

Fig. 17 is a perspective view of the parachute packed in its releasable container or jacket.

Referring by numerals to the accompanying drawings, and particularly to the construction illustrated in Figs. 1, 2, 3, 4 and 5, 10 designates the body of the parachute which has the conventional umbrella shape and composed of strong, lightweight, flexible waterproof material, for instance, rubberized silk or linen.

The usual shrouds (not shown) depend from the edge of the body 10 and carry the usual passenger suspension straps or harness.

Formed in the center of body 1 is an air vent 11 and located on the underside of said body and surrounding said vent is a manifold 12, preferably ring-shaped and composed of rubber or waterproof fabric.

Secured to this manifold are the inner ends of radially disposed inflatable arms 13 composed of rubber or rubberized fabric, the same having flat upper faces 14, which lie flat against the underface of body 10 in order to normally close air vents 15 which are formed in said body directly above said arms.

In the manufacture of the manifold 12 and arms 13 the latter are curved lengthwise to conform with the curvature of the body 10 when open and thus, when applied to said body, the flat upper faces of the arms close and render the vents 15 practically air tight. Manifold 12 and arms 13 are secured to body 10 at the ends of said arms by suitable ties 16.

Suitably secured to the underside of central portions of arms 13 are the upper ends of depending pull cords 17, by means of which the intermediate portions of the arms may be drawn downwardly away from the body 10, so as to uncover vents 15 (see Fig. 2).

Secured to the inner side of manifold 12 is a conventional pneumatic inflating valve 18, the stem of which projects upwardly through vent 11 in order that air or gas under pressure may be pumped into said manifold.

If desired the flat upper faces 14 of the arms 13 may be provided with lugs 13ª which normally enter and close the vents 15 (see Fig. 5).

In some instances, it may be found desirable to locate in the outer end or arms 13, relief valves 19 which open on contact with the earth or a solid surface, thereby bringing about deflation of the inflated parts of the parachute at the termination of its descent.

The parachute is made ready by folding and wrapping the body inwardly from its margin and valve 18 open to permit the arms 13 to deflate and collapse, and finally the complete structure is made into a compact package with the manifold at the top and the valve 18 exposed.

The package is now placed in a suitable container or jacket and placed on the wearer's back, in his lap or as a seat cushion with the shrouds connected to the strap or harness worn by the wearer. By means of a readily detachable tube leading from a source of compressed air or gas to supply valve 18, which latter may be of quick opening type (such as the U. S. Army Nos. 23 and 24) fluid pressure, for instance, $CO_2$ gas, or helium gas, is delivered through valve 18 to inflate manifold 12, and in some instances partially fill the arms 13, which latter are held in a practically collapsed and deflated condition, by the surrounding rolled and folded body 10, and the container or jacket in which the latter is packed.

Thus, the package is under a substantial degree of internal pressure which tends to expand said body and when the wearer jumps from the aircraft or, after the elapse of a short interval of time when jumping from a considerable height, the rip cord attached to the latch or keeper that holds the container is pulled to release the container or jacket, whereupon the parachute will discharge from said container and will instantly open to assume its normal shape, by movement of the arms 13, which assume their normal shapes, under the influence of the compressed fluid that rushes from the manifold into said arms.

The instant opening of the parachute provides an extremely desirable high safety factor, particularly when the wearer jumps from a low flying airplane or when forced to jump from a plane which is out of control and about to crash.

The parachute during its descent, may be guided laterally by pulling on the cords 17 so as to draw the central portions of the inflated arms 13 away from the body 10 and thereby uncover vents 15.

By simultaneously pulling all of the cords 17, a number of the vents 15 may be uncovered at the same time and thus the speed of descent of the parachute may be very accurately controlled and consequently enabling the user to avoid rifle and machine gun fire from the ground.

When one of the arms is thus pulled downwardly, the escape of fluid through the opening vents, as illustrated on the right hand side of Fig. 2, will cause the parachute to shift in the direction indicated by arrow A in Fig. 2.

Thus, the person in the parachute can manipulate same so as to avoid dropping onto buildings, or into trees, streams or barbed wire entanglements.

In some instances, body 10 is split to form slots which are closed by radially disposed strips 20 of flexible material applied to the upper faces of the segments and secured thereto, along their radial edges. Formed in strips 20 are air vents 15 (see Fig. 6).

This construction forms shoulders along the edges of the body segments and which shoulders engage the edges of the arms 13 at the sides of the flat upper faces 14, so as to more effectively retain the arms in true radial positions.

In Fig. 7 body 10 is shown slotted radially for short distances away from vent 11 and the slots thus formed are equipped with conventional slide fasteners 21. Thus, if this form of parachute should drop onto the surface of the sea or other large body of water, the person carried by the parachute can release the slide fasteners to enable head to be passed upwardly through the enlarged vent and the surrounding manifold and thus the parachute, which is buoyant due to the inflated arms and manifold, will function as an efficient life preserver.

In Fig. 8 is illustrated a lip or tongue 22 formed within the arm 13ª near manifold 12ª thus providing a restricted opening 23 to choke the flow of compressed air or gas from the manifold into the radial arms.

In Fig. 9 the flexible material used in the construction of the body 10, is shown as having portions formed into tubular arms such as 24, the same occupying radial positions on the underside of body 10 and functioning the same as arms 13.

Figs. 10 and 11 illustrate a structure wherein the manifold 12 is dispensed with and the radial arms 13ᵇ are directly connected to each other at their inner ends.

In this modification air vents 11ª are formed through body 10 in the corners between ends of the radial arms.

In Fig. 12 I have shown the intermediate portions of all of the inflatable arms drawn away from the body of the parachute so as to simultaneously open a number of air vents and thereby increase the speed of descent.

In Fig. 13 the parachute in its container is shown in position on the wearer's back with the inflating valve connected to a compressed fluid container C. Fig. 14 shows the outer end of one of the inflatable arms 13 provided with a restricted vent 13ᶜ which permits the fluid admitted to the arm, for the purpose of inflating same, to discharge from said arm after the quick parachute opening function has been accomplished.

In Fig. 15 the parachute is shown in packed condition with the rip cord R connected to the release pins P and to the inflating valve 18.

In Fig. 16 the walls of the inflatable arms 13 are shown provided adjacent the manifold 12, with kinked portions K which fit, one within the other when the arm is deflated, thus tending to more effectively close the collapsed arms against the admission of compressed fluid from the manifold, when the parachute is folded and packed.

Fig. 17 is a perspective view of the parachute in packed condition with the inflating valve exposed.

Should the user of the parachute accidentally fall onto same as it opens, the descent may still be made safely, due to the fact that the inflated arms, where equipped with the valve 19, will maintain the parachute in full open position.

The provision of a number of air vents, such as 15, in the body of the parachute with means for controlling the escape of air through said vents, permits the use of larger bodies or canopies without decrease of speed, as compared to the types of parachutes now in general use.

My improved parachute in small sizes may be advantageously employed for the dropping of flares, food, water, medical supplies, ammunition, small arms and the like.

Thus it will be seen that I have provided a parachute which is simple in construction, inexpensive of manufacture and very effective in performing the functions for which it is intended, viz., instant opening of the parachute when released from its container or jacket, ability to steer the parachute laterally in any direction, also control of descent.

It will be understood that minor changes in the size, form and construction of the various parts of my improved parachute may be made and substituted for those herein shown and described without departing from the spirit of the invention, the scope of which is set forth in the appended claims.

I claim as my invention:

1. In a parachute, an umbrella shaped body, a manifold located on the underside of the control portion of said body, inflatable arms projecting radially from said manifold and lying against the underface of said body with their ends secured thereto, the intermediate portions of which arms are free to move away from said body and there being air vents formed in said body, which vents are normally closed by said arms and open when said arms are drawn away from said body.

2. A parachute as set forth in claim 1 including means for drawing the intermediate portions of said arms away from said body.

3. A parachute as set forth in claim 1 including an inflating valve connected to said manifold and with pressure release valves located in the outer portions of said arms.

4. A parachute as set forth in claim 1 and with radial shoulders on said body for engaging and holding the intermediate portions of said arms against lateral movement while positioned against said body.

5. A parachute as set forth in claim 1 and there being an air vent formed in the center of said body.

6. A parachute as set forth in claim 1 including lugs on the upper faces of said arms, which lugs are adapted to enter the air vents of said body.

7. A parachute as set forth in claim 1 including means for restricting the flow of fluid from said arms.

8. A parachute as set forth in claim 1, which body is provided with a centrally disposed air vent, and slits extending radially from said vent and releasable means normally closing said slits.

9. In a parachute, an umbrella shaped body, a plurality of inflatable arms radially disposed on the underside of said body and the latter being formed with air vents in the corners between the inner ends of said arms.

10. In a parachute, an umbrella shaped body composed of flexible material and portions of the material forming said body constituting inflatable tubes which are disposed radially on the underside of said body.

11. The combination with a parachute body provided with air vents, of an inflatable structure located on the underface of said body, which structure includes a centrally arranged manifold and a plurality of inflatable arms connected to and extending radially from said manifold, which arms normally close the air vents in said body.

12. The combination with a parachute body, of inflatable means located on the under side said body, for opening same from a folded condition, a container adapted to receive the parachute when folded and means for partially inflating said inflatable means while the parachute is in packed condition to impart internal pressure to the package.

13. The combination as set forth in claim 12 including means for releasing said container to permit the discharge of said parachute and inflatable means.

14. The hereindescribed method of packaging a parachute which is equipped with inflatable means, which consists in folding and packing the parachute and its inflatable means into a container and then delivering fluid pressure to said inflatable means so as to produce internal pressure within said packed parachute.

RALPH DE LOPEZ.